(12) United States Patent
Roberts et al.

(10) Patent No.: US 8,612,313 B2
(45) Date of Patent: Dec. 17, 2013

(54) METADATA SUBSCRIPTION SYSTEMS AND METHODS

(75) Inventors: Brian F. Roberts, Dallas, TX (US); Donald H. Relyea, Dallas, TX (US); Alex Zavatone, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 743 days.

(21) Appl. No.: 12/716,513

(22) Filed: Mar. 3, 2010

(65) Prior Publication Data

US 2011/0218882 A1    Sep. 8, 2011

(51) Int. Cl.
*G06Q 30/00* (2012.01)
(52) U.S. Cl.
USPC ........................................ 705/27.1; 705/26.1
(58) Field of Classification Search
USPC .................................................... 705/26, 27
See application file for complete search history.

(56) References Cited

U.S. PATENT DOCUMENTS

| | | | |
|---|---|---|---|
| 6,311,194 B1* | 10/2001 | Sheth et al. | 715/236 |
| 2002/0138291 A1* | 9/2002 | Vaidyanathan et al. | 705/1 |
| 2003/0182315 A1* | 9/2003 | Plastina et al. | 707/200 |
| 2006/0212444 A1* | 9/2006 | Handman et al. | 707/5 |
| 2007/0100701 A1* | 5/2007 | Boccon-Gibod et al. | 705/21 |
| 2011/0010258 A1* | 1/2011 | Chavez et al. | 705/26.1 |

OTHER PUBLICATIONS

Taalee: "Taalee Inks Deal with Voquette to Provide Semantic Engine for Personal Web Audio," Business Wire, Sep. 26, 2000, Dialog file 521 #02657237, 2pgs.*

* cited by examiner

*Primary Examiner* — Rob Pond

(57) ABSTRACT

Exemplary metadata subscription methods and systems are disclosed herein. An exemplary method includes a metadata subscription system receiving data representative of a subscription by a user to one or more metadata values, identifying at least one media content instance that has the one or more metadata values, and providing the user with access to the identified at least one media content instance. Corresponding methods and systems are also disclosed.

22 Claims, 8 Drawing Sheets

METADATA SUBSCRIPTION SYSTEMS AND METHODS

BACKGROUND INFORMATION

Advances in electronic communications technologies have interconnected people and allowed for distribution of information perhaps better than ever before. To illustrate, personal computers, handheld devices, mobile phones, set-top box devices, and other electronic devices are increasingly being used to access, store, download, share, and/or otherwise process various types of media content (e.g., video, audio, photographs, and/or multimedia).

Users of such access devices often access media content by subscribing to media content services provided by service providers. A limitation associated with typical subscription services, however, is that they may be limited to individual media content files or predetermined packages of "channels" offered by content providers. As a result, service providers do not have the flexibility to tailor a media content subscription in accordance with the specific interests and desires of a user. The subscription may be further limited by a content provider's corresponding programming schedule.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Figure 1:
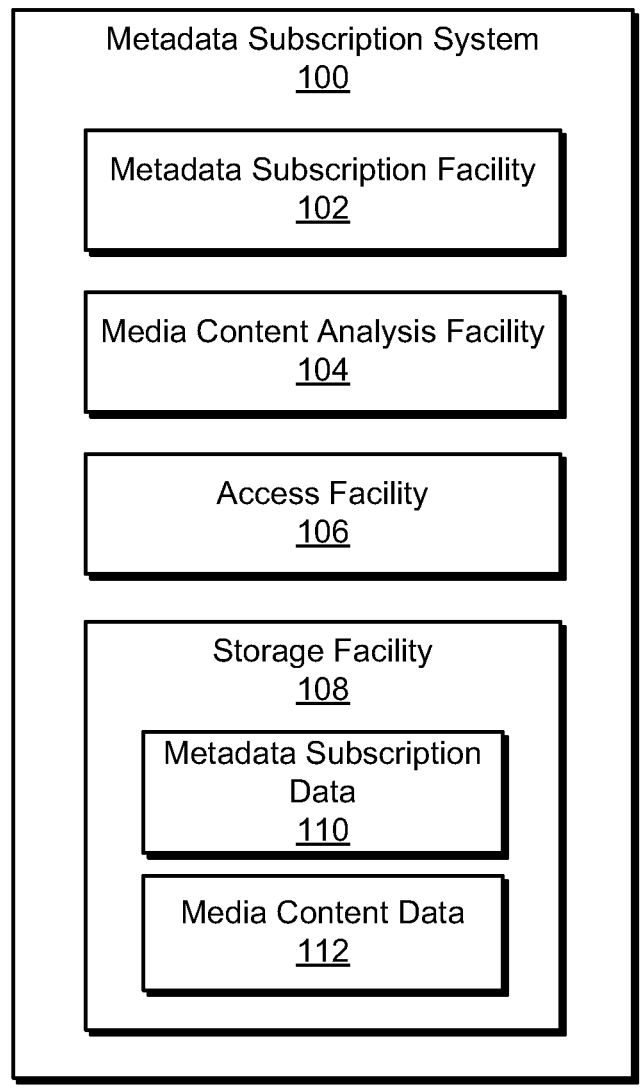
FIG. 1 illustrates an exemplary metadata subscription system according to principles described herein.

Exemplary metadata subscription methods and systems are disclosed herein. As described in more detail below, a metadata subscription system may receive data representative of a subscription by a user to one or more metadata values, identify at least one media content instance that has the one or more metadata values included in the subscription, and provide the user with access to the identified at least one media content instance. In this or a similar manner, the exemplary systems and methods described herein may allow a service provider or other entity to easily identify and/or provide access to desired media content instances by providing customizable subscriptions to one or more metadata values associated with the desired media content instances.

As used herein, "media content" may refer generally to any content accessible via a media content access subsystem. The term "media content instance" refers to any data record or object (e.g., an electronic file) storing, including, or otherwise associated with media content, which may include data representative of a song, audio clip, movie, video, image, photograph, text, document, application file, or any segment, component, or combination of these or other forms of content that may be experienced or otherwise accessed by a user. A media content instance may have any data format as may serve a particular application. For example, a media content instance may include an audio file having an MP3, WAV, AIFF, AU, or other suitable format, a video file having an MPEG, MPEG-2, MPEG-4, MOV, DMF, DivX, or other suitable format, an image file having a JPEG, BMP, TIFF, RAW, PNG, GIF or other suitable format, and/or a data file having any other suitable format.

The term "metadata" as used herein refers generally to any electronic data descriptive of media content and/or media content instances. Hence, metadata may include, but is not limited to, time data, physical location data, user data, source data, destination data, size data, creation data, modification data, access data (e.g., play counts), and/or any other data descriptive of content and/or one or more media content instances. For example, metadata corresponding to a song may include a title of the song, a name of the song's artist or composer, a name of the song's album, a genre of the song, a length of the song, a rating of the song, one or more graphics corresponding to the song (e.g., album art), and/or any other information corresponding to the song as may serve a particular application. Metadata corresponding to a video may include a title of the video, a name of one or more people associated with the video (e.g., actors, directors, producers, creators, etc.), a rating of the video (e.g., user ratings, critic ratings, etc.), a synopsis of the video, a setting of the video, a theme of the video, a format of the video, a quality (e.g., resolution) of the video, a size of the video, a time or date associated with the video (e.g., time or date of production, time or date of release, etc.), a color content of the video, a bit-rate of the video, a compression amount of the video, a codec associated with the video, and/or any other information corresponding to the video as may serve a particular application. Metadata corresponding to other types of media content instances may include additional or alternative information.

The term "metadata category" (or simply "category") as used herein refers to a particular type of metadata or metadata values associated with a plurality of media content instances. To illustrate, a metadata category may include a media content instance title category, an album title category, a genre category, an actor category, a video quality category, and/or any other category associated with a plurality of media content instances. Additional or alternative metadata categories may be associated with a plurality of media content instances as may serve a particular application. One or more "metadata values" may be included within each metadata category. A metadata value may include any portion of metadata associated with a media content instance. For example, metadata values within a "video quality" metadata category may include specific video quality values, metadata values within an "actor" metadata category may include names of individual actors, and metadata values within a "genre" metadata category may include names of specific genres.

FIG. 1 illustrates an exemplary metadata subscription system 100 (or simply "system 100"). As will be described in more detail below, system 100 may be configured to facilitate subscription by a user to one or more specific metadata values and access by the user to one or more media content instances that have the one or more metadata values.

System 100 may include, but is not limited to, a metadata subscription facility 102, a media content analysis facility 104, an access facility 106, and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular application.

As will be described in more detail below, metadata subscription facility 102 (or simply "subscription facility 102") may be configured to receive data representative of a subscription by a user to one or more metadata values (referred to herein as a "metadata subscription"). The one or more metadata values may be descriptive of one or more attributes of media content that the user prefers, is interested in, or otherwise cares about. Exemplary metadata values are set forth above and will be described in more detail below.

Subscription facility 102 may be configured to receive data representative of a subscription by a user to one or more metadata values in any suitable manner as may serve a particular implementation. For example, subscription facility 102 may be configured to provide a graphical user interface ("GUI") including a plurality of selectable metadata values displayed therein. Subscription facility 102 may facilitate and/or detect a selection by a user of one or more metadata values to be included in the metadata subscription by way of the GUI. An exemplary GUI that may be provided by subscription facility 102 in order to facilitate user selection of one or more metadata values to be included in a metadata subscription will be described in more detail below.

Additionally or alternatively, subscription facility 102 may analyze media content instances associated with a user, such as media content instances maintained by an access device associated with the user and/or accessed (e.g., downloaded and/or viewed) by the user prior to receiving the one or more metadata values to be included in the metadata subscription, and automatically obtain metadata values to be included in a metadata subscription based on the analysis. An example of obtaining metadata values to be included in a metadata subscription based on an analysis of media content instances associated with a user will be described in more detail below.

Media content analysis facility 104 (or simply "analysis facility 104") may be configured to identify at least one media content instance that has the one or more metadata values included in the metadata subscription. For example, analysis facility 104 may analyze a plurality of media content instances to identify which of the plurality of media content instances has the one or more metadata values included in the metadata subscription. The plurality of media content instances analyzed by analysis facility 104 may be maintained by storage facility 108, one or more web servers, one or more access devices associated with a user associated with the metadata subscription, one or more access devices associated with one or more other users, and/or any other computing device as may serve a particular implementation. As will be described in more detail below, analysis facility 104 may be configured to dynamically identify a plurality of media content instances that have the one or more metadata values during a predetermined time period associated with the metadata subscription.

Access facility 106 may be configured to provide a user with access to the at least one media content instance identified by analysis facility 104. For example, access facility 106 may be configured to deliver the identified at least one media content instance to an access device associated with the user. Additionally or alternatively, access facility 106 may be configured to direct one or more other access devices associated with one or more other users to each transmit at least a portion of the identified at least one media content instance to the access device associated with the user (e.g., over a peer-to-peer file sharing network).

Storage facility 108 may be configured to maintain metadata subscription data 110 and media content data 112. Metadata subscription data 110 may include data representative of one or more subscriptions by one or more users to one or more metadata values. Media content data 112 may include data representative of one or more media content instances, one or more of which have the metadata values included in the metadata subscription(s). Storage facility 108 may be configured to maintain additional or alternative data as may serve a particular application.

Figure 2:
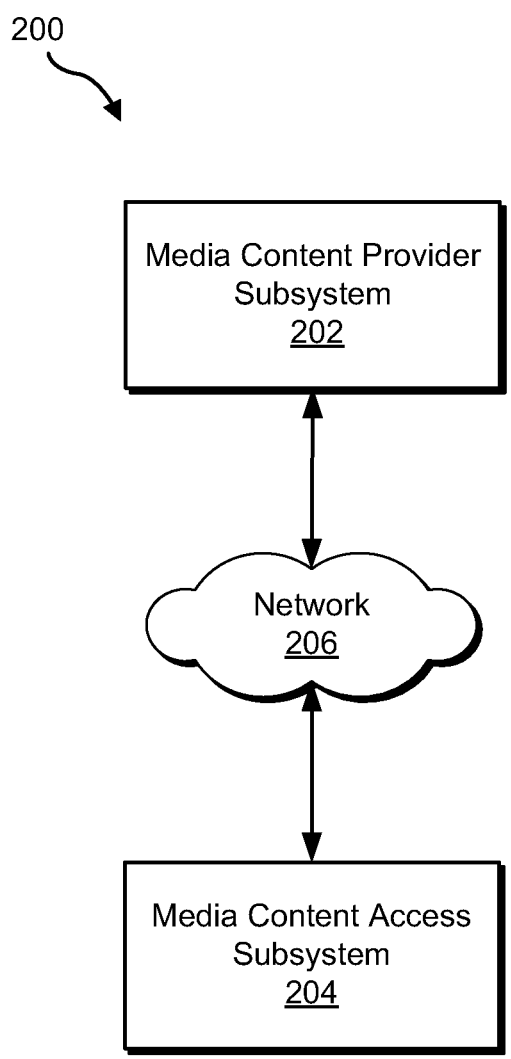
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, subscription facility 102, analysis facility 104, access facility 106, and storage facility 108 may each be implemented on one or both of provider subsystem 202 and access subsystem 204.

Access subsystem 204 may be configured to communicate with and receive a signal and/or data stream containing data representative of media content and/or data associated with media content (e.g., metadata, etc.) from provider subsystem 202. Access subsystem 204 and provider subsystem 202 may communicate using any suitable communication technologies, devices, networks, network platforms, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network (e.g., a Verizon® FIOS® network), the Internet, an intranet, local area network, any other suitable network, and/or any combination or subcombination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection). Moreover, it will be recognized that in some examples, system 100 may be implemented entirely by provider subsystem 202 or by access subsystem 204.

In some examples, provider subsystem 202 may be configured to generate or otherwise provide media content (e.g., in the form of one or more media content streams, one or more media content files, etc.) to access subsystem 204. Access subsystem 204 may be configured to facilitate access by a user to media content received from provider subsystem 202. To this end, access subsystem 204 may present the media content for experiencing (e.g., viewing) by a user, record the media content, parse metadata and/or other data associated with the media content, etc. Presentation of the media content may include, but is not limited to, displaying, playing, or otherwise presenting the media content, or one or more components of the media content, such that the media content may be experienced by the user.

Access subsystem 204 may be implemented as may suit a particular application. For example, access subsystem 204 may be implemented by a media content access device, which may include, but is not limited to, a set-top box device, a digital video recorder ("DVR") device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

Figure 3:
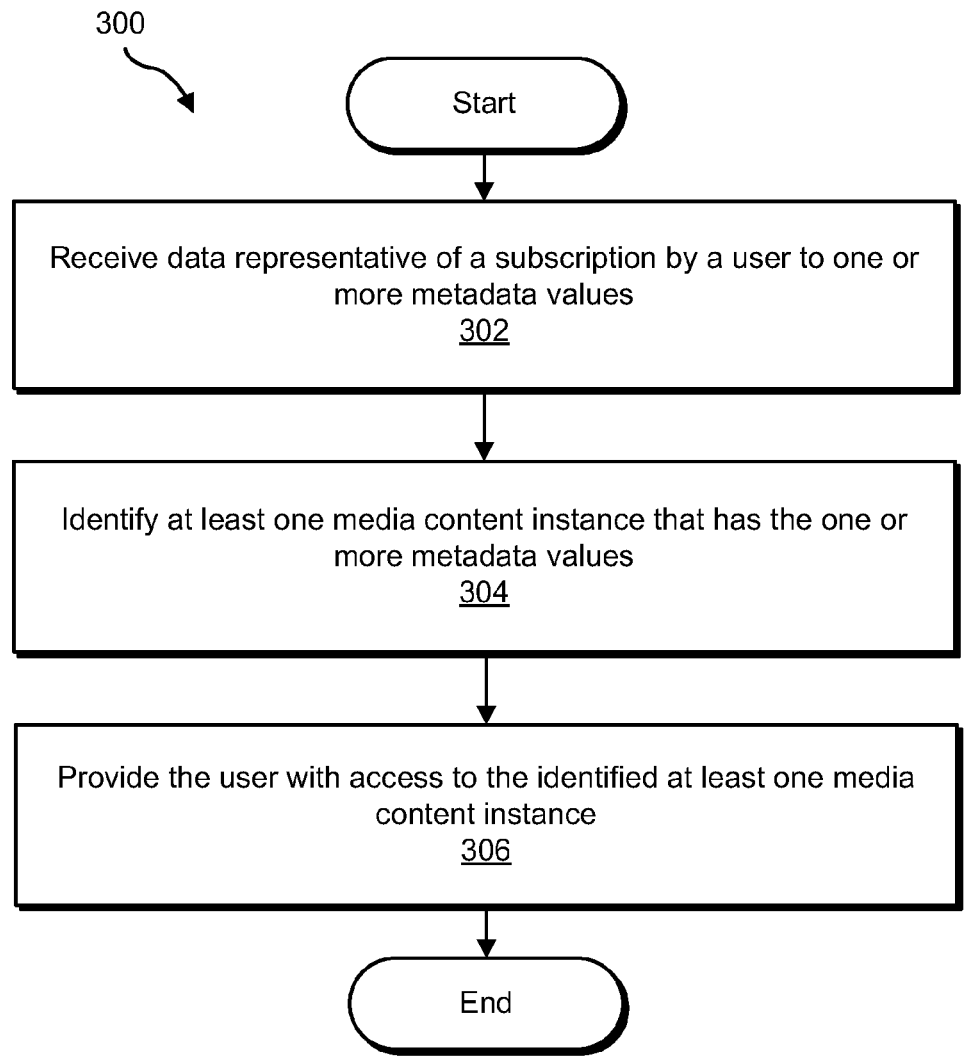
FIG. 3 illustrates an exemplary metadata subscription method according to principles described herein.

FIG. 3 illustrates an exemplary media content instance access method 300. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of system 100.

In step 302, data representative of a subscription by a user to one or more metadata values is received. The data representative of the subscription may be received by subscription facility 102 in any suitable manner.

Figure 4:
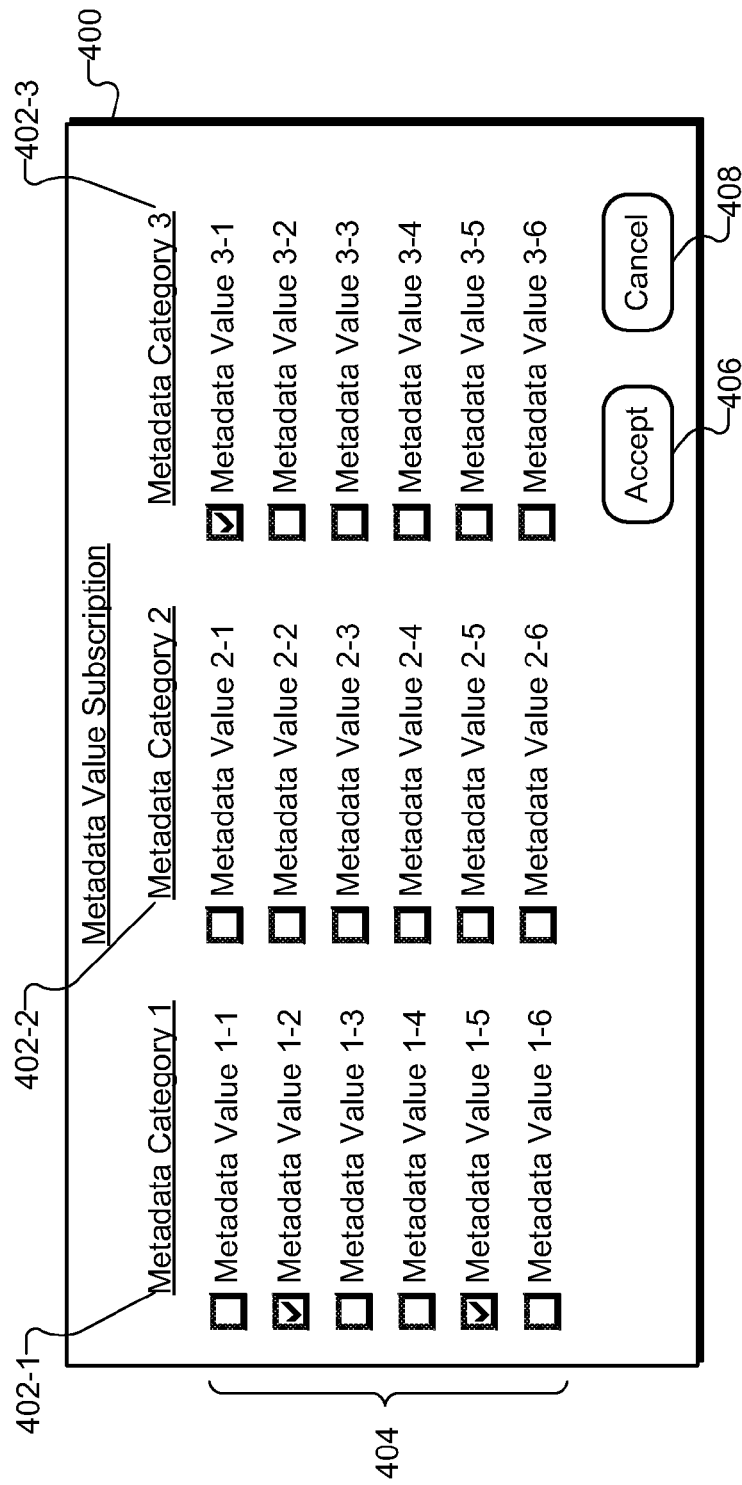
FIG. 4 illustrates an exemplary graphical user interface ("GUI") within which a plurality of selectable metadata values may be displayed according to principles described herein.

For example, the data representative of the subscription by the user to the one or more metadata values may be received by way of a GUI provided by subscription facility 102. FIG. 4 illustrates an exemplary GUI 400 that may be provided by subscription facility 102 and that may be configured to facilitate selection by a user of one or more metadata data values to be included in a metadata subscription. GUI 400 may be presented to the user in any suitable manner as may serve a particular implementation. For example, GUI 400 may be presented to the user in a web browser as part of a web-based application configured to provide the user with access to media content instances, on a display device associated with a set-top box device, and/or in any other suitable manner.

As shown in FIG. 4, a plurality of metadata categories 402 (e.g., metadata categories 402-1 through 402-3), each including a plurality of selectable metadata values 404 associated therewith, may be displayed within GUI 400. GUI 400 shows three metadata categories 402 and six metadata values 404 included in each metadata category 402 for illustrative purposes only. It will be recognized that any number of metadata categories 402 each including any number of metadata values 404 may be displayed within GUI 400 as may serve a particular implementation. GUI 400 may also include selectable options (e.g., options 406 and 408) configured to allow a user to accept or cancel a subscription to selected metadata values 404.

In some examples, a user may utilize GUI 400 to select one or more metadata values 404 to be included in a metadata subscription. For example, the user may select one or more check boxes displayed in GUI 400 to select any number or metadata values 404 to be included in a metadata subscription. To illustrate, FIG. 4 shows that a user has selected metadata values 404 labeled "Metadata Value 1-2," "Metadata Value 1-5," and "Metadata Value 3-1" to be included in a metadata subscription. The selected metadata values 404 may correspond to attributes that the user prefers, is interested in, or otherwise desires in a media content instance.

For example, a user may prefer to view and/or access media content instances that have a particular video quality (e.g., 1080p), a particular source (e.g., directly from a website associated with a media content creator), a particular file size (e.g., less than 1 GB), a particular director (e.g., a director named Jared Hess), a particular genre (e.g., comedy), and a particular rating (e.g., critic rating). The user may utilize GUI 400 to indicate that the metadata subscription is to include these particular metadata values. As will be described in more detail below, the selected metadata values 404 may be used by analysis facility 104 to automatically identify one or more media content instances that may be of interest to the user.

In some examples, the one or more metadata values included in the metadata subscription may be determined automatically based on an analysis of media content instances associated with the user, such as an analysis of one or more media content instances that have been previously accessed (e.g., downloaded and/or viewed) by the user (e.g., prior to receipt of data representative of one or more metadata values to be included in the metadata subscription). The media content instances associated with the user, or a record thereof, may be maintained by an access device (e.g., a personal computer, media player, etc.) associated with the user, storage facility 108, and/or any other computing device as may serve a particular implementation. Subscription facility 102 may be configured to analyze one or more media content instances associated with the user and determine, from the analysis, one or more metadata values associated with the media content instances.

One or more of the identified metadata values may be inserted or proposed for insertion in the metadata subscription based on the analysis. For example, subscription facility 102 may determine that a particular set of metadata values appear more often than other metadata values in media content instances accessed by the user and automatically include the set of metadata values in the metadata subscription.

To illustrate, subscription facility 102 may determine that a majority of media content instances already accessed by a user have a particular video quality (e.g., 1080p) and are of a particular genre (e.g., action). In addition, subscription facility 102 may determine that the user rates media content instances having a particular actor (e.g., an actor named Gerard Butler) higher than media content instances that do not have the particular actor. Based on these determinations, subscription facility 102 may automatically include the metadata values corresponding to the particular video quality, the particular genre, and the particular actor in the metadata subscription.

In some examples, one or more media content instances accessed by the user may not already have metadata values associated therewith. In such instances, the analysis performed by subscription facility 102 may provide information regarding one or more characteristics of the analyzed media content instances. Based on the analysis, one or more metadata values may be automatically generated and associated with or assigned to the analyzed media content instances. One or more of the automatically generated metadata values may then be included in the metadata subscription.

In some examples, one or more metadata values may be excluded from the metadata subscription. In this manner, media content instances having the excluded metadata values will not be identified as being of interest to the user and will therefore not be presented to the user. Accordingly, data representative of one or more instructions to exclude one or more metadata values from a metadata subscription may also be received by subscription facility 102. To illustrate, a user may not want to access media content instances provided by a particular source (e.g., a particular website), having a particular video quality (e.g., 720p or less), associated with a particular director (e.g., a director named Steven Spielberg), and/or having a particular content rating (e.g., an "R" rating). Accordingly, the metadata subscription associated with the user may include instructions to prevent media content having any of these particular metadata values from being identified and presented to the user.

Returning to FIG. 3, as shown in step 304, at least one media content instance that has the one or more metadata values included in the metadata subscription received in step 302 is identified. Analysis facility 104 may be configured to perform step 304 in any suitable manner as may serve a particular implementation. For example, analysis facility 104 may be configured to compare the one or more metadata values included in the metadata subscription to metadata values associated with a plurality of media content instances to identify which media content instances have one or all of the one or more metadata values included in the subscription.

In some examples, analysis facility 104 may be configured to dynamically perform the identification of the at least one media content instance during and/or over a predetermined time period associated with the metadata subscription. The predetermined time period may be defined by the user, a content provider, service provider, and/or any other entity as may serve a particular application. For example, a service provider may specify that a metadata subscription may last for a week, month, year, or any other subscription time period. Hence, analysis facility 104 may be configured to identify media content instances that include the one or more metadata values included in the metadata subscription only during the subscription time period.

In step 306, the user is provided with access to the at least one media content instance identified in step 304. Access facility 106 may be configured to provide the user with access to the identified at least one media content instance in any suitable manner as may serve a particular application. For example, access facility 106 may allow the user to access, store, stream, download, share, and/or otherwise process the identified at least one media content instance.

In some examples, access facility 106 may provide the user with access to the identified at least one media content instance by presenting a list of identified media content instances to the user in a GUI. The user may utilize the GUI to access (e.g., view and/or download) one or more of the identified media content instances.

Figure 5:
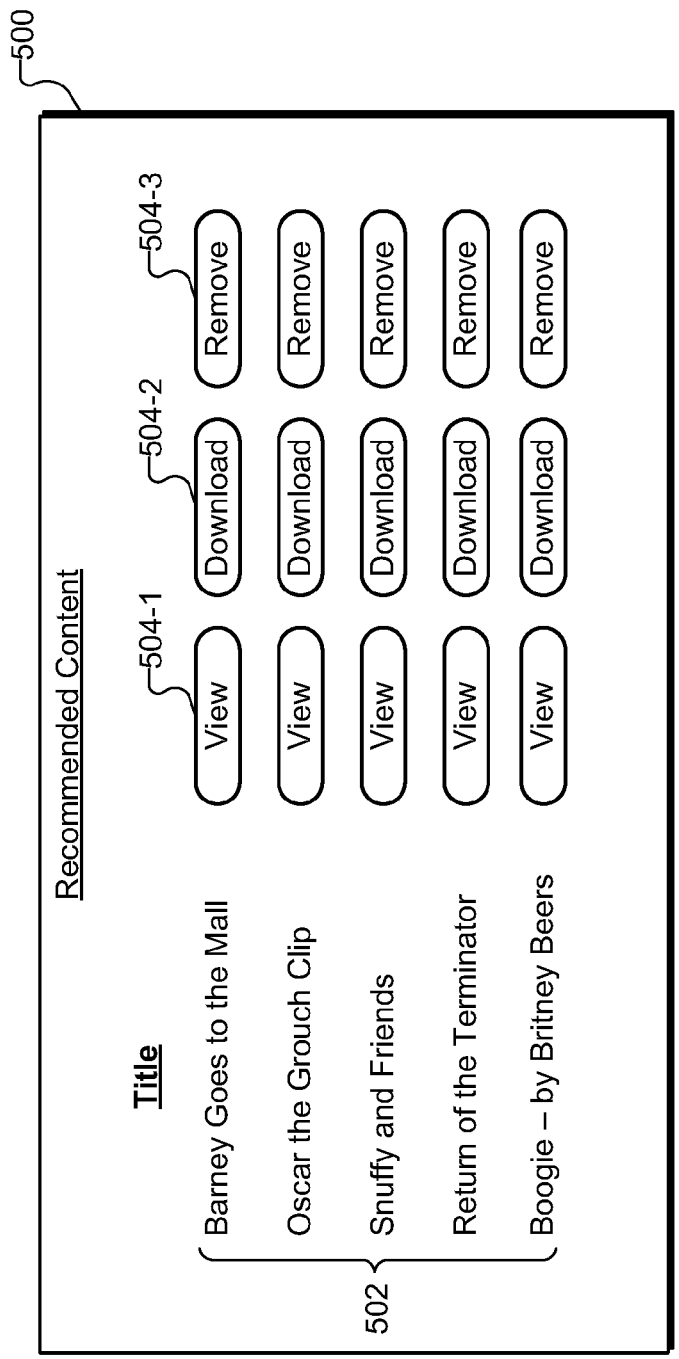
FIG. 5 illustrates an exemplary GUI within which information and options associated with recommended media content may be displayed according to principles described herein.

To illustrate, FIG. 5 shows an exemplary GUI 500 that may be presented by access facility 106 and that may be configured to provide the user with access to one or more media content instances identified by analysis facility 104. GUI 500 may be presented to the user in any suitable manner as may serve a particular implementation. For example, GUI 500 may be presented to the user in a web browser as part of a web-based application configured to provide the user with access to media content instances, on a display device associated with a set-top box device, and/or in any other suitable manner.

As shown in FIG. 5, a list 502 of media content instances identified as having the metadata values included in the metadata subscription received by subscription facility 102 may be displayed in GUI 500. List 502 may be presented in any suitable order as may serve a particular application. For example, list 502 may be presented in order of relevance (i.e., the media content instance deemed most likely to be of interest to the user may be listed first), in alphabetical order, etc.

A user may take any suitable action with respect to the media content instances included in list 502. For example, a plurality of selectable options 504 (e.g., options 504-1 through 504-3) associated with each media content instance included in list 502 may be displayed in GUI 500. A user may select option 504-1, for example, to view or otherwise experience an associated media content instance (e.g., "Barney goes to the Mall"), option 504-2 to download the media content instance, and/or option 504-3 to remove the media content instance from list 502.

In some examples, analysis facility 104 and access facility 106 may dynamically adapt one or more operations thereof in response to an interaction of a user with GUI 500. For example, if a user selects an option to remove the media content instance entitled "Boogie—by Britney Beers") from list 502, analysis facility 104 may analyze the metadata values associated with the removed media content instance and update an identification heuristic by which analysis facility 104 operates in accordance with the analysis. In this manner, system 100 may dynamically adapt to a particular user over time in order to more accurately identify media content instances that may be of interest to the user.

Additionally or alternatively, access facility 106 may provide the user with access to the identified at least one media content instance by automatically delivering the identified at least one media content instance to an access device (e.g., a personal computer, set-top box device, handheld device, etc.) associated with the user for storage by the access device. For example, once the at least one media content instance is identified, data representative of the at least one media content instance may be automatically transmitted to an access device associated with the user. In this manner, the user may access a locally stored copy of the at least one media content instance.

Additionally or alternatively, access facility 106 may provide the user with access to the identified at least one media content instance by directing one or more other access devices associated with one or more other users to each transmit at least a portion of the identified at least one media content instance to an access device associated with the user. By directing other access devices to each transmit at least a portion of a media content instance to the access device associated with the user instead of transmitting the entire media content instance from a single source, the media content instance may be provided to the user in a more efficient manner.

Figure 6:
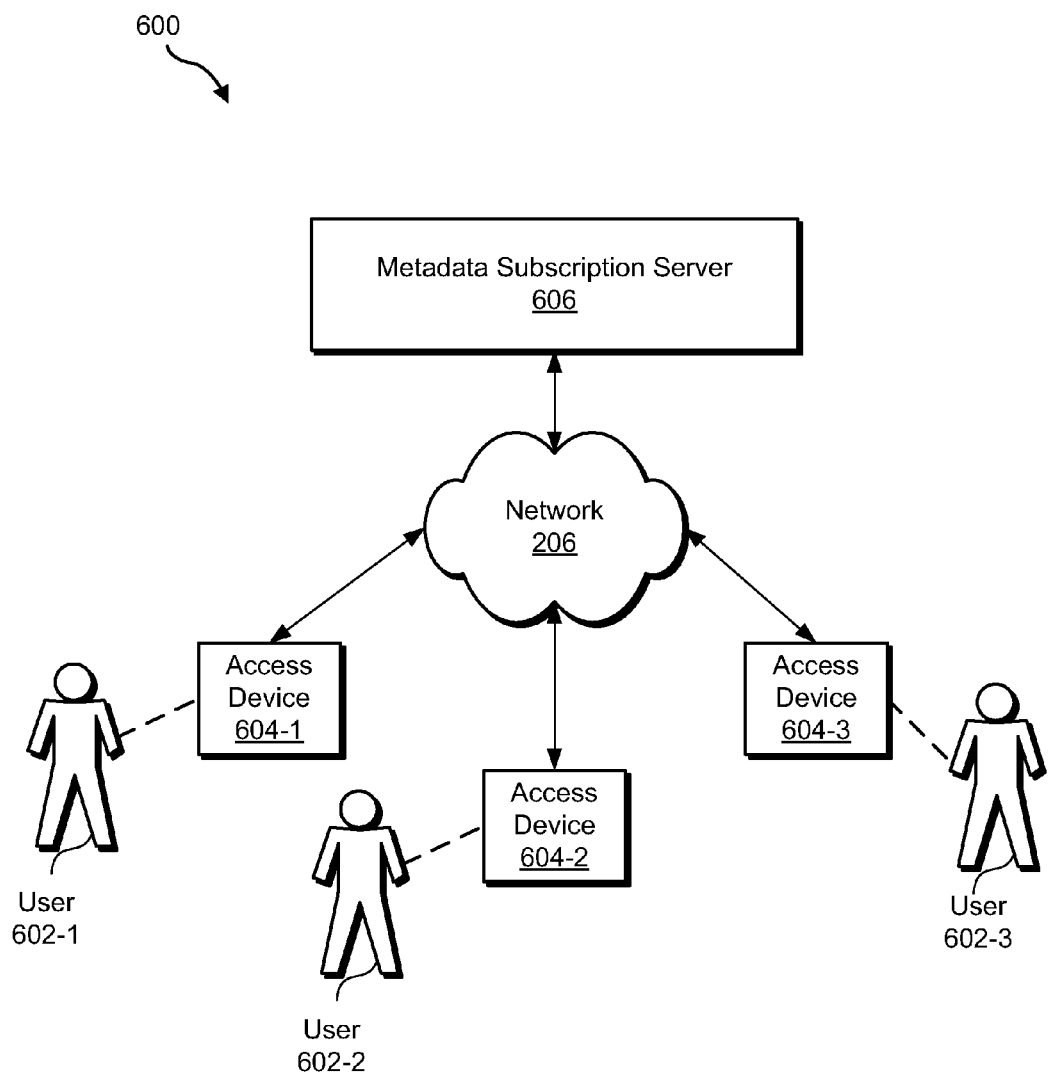
FIG. 6 illustrates another exemplary implementation of the system of FIG. 1 according to principles described herein.

To illustrate, FIG. 6 shows an exemplary implementation 600 of system 100 wherein multiple access devices 604 (e.g., access devices 604-1 through 604-3) are configured to communicate with a metadata subscription server 606 (or simply "server 606") over network 206. At least a portion of system 100 may be implemented by metadata subscription server 606 and/or one or more of access devices 604.

Each access device 604 may be associated with or used by a distinct user 602 (e.g., users 602-1 through 602-3). Each access device 604 may include, but is not limited to, a set-top box device, a media content processing device, a communications device, a media content player device, a mobile device (e.g., a mobile phone device), a handheld device, a personal computer, a phone device (e.g., Verizon Hub device), a personal-digital assistant device, a gaming device, a DVR device (e.g., a personal video recording PVR device), a television device, and/or any device configured to perform one or more of the processes and/or operations described herein.

In some examples, server 606 may identify a media content instance as including the metadata values included in a metadata subscription provided by user 602-1 and provide user 602-1 with access to the media content instance by way of network 206. User 602-1 may download the media content instance to access device 604-1 from server 606. Thereafter, server 606 may direct access device 604-1 to transmit all or a portion of the media content instance to access device 604-2 when the second user 602-2 desires to also access the media content instance. Server 606 may then direct access devices 604-1 and 604-2 to each transmit a portion of the media content instance to access device 604-3 when the third user 602-3 desires to access the media content instance. In this manner, each access device 604 may become the source for at least a portion of the media content instance, thereby facilitating delivery of the media content instance to other access devices in a relatively more efficient manner.

In some examples, access facility 106 may be configured to provide access to an identified media content instance during a predetermined time period. For example, access facility 106 may be configured to discontinue access by the user to the identified media content instance after a predetermined time period has elapsed. The predetermined time period may be specified by the content provider, service provider, user, and/or any other entity as may serve a particular application. In some examples, the predetermined time period may be specified in metadata associated with the identified media content instance. Access facility 106 may be configured to overwrite the metadata specifying the predetermined time period in response to an instruction by a service provider or any other entity.

In some examples, access facility 106 may be configured to bill the user and/or another entity (e.g., an advertiser) for access to an identified media content instance. The billing may be performed in accordance with any suitable transaction heuristic as may serve a particular implementation.

Figure 7:
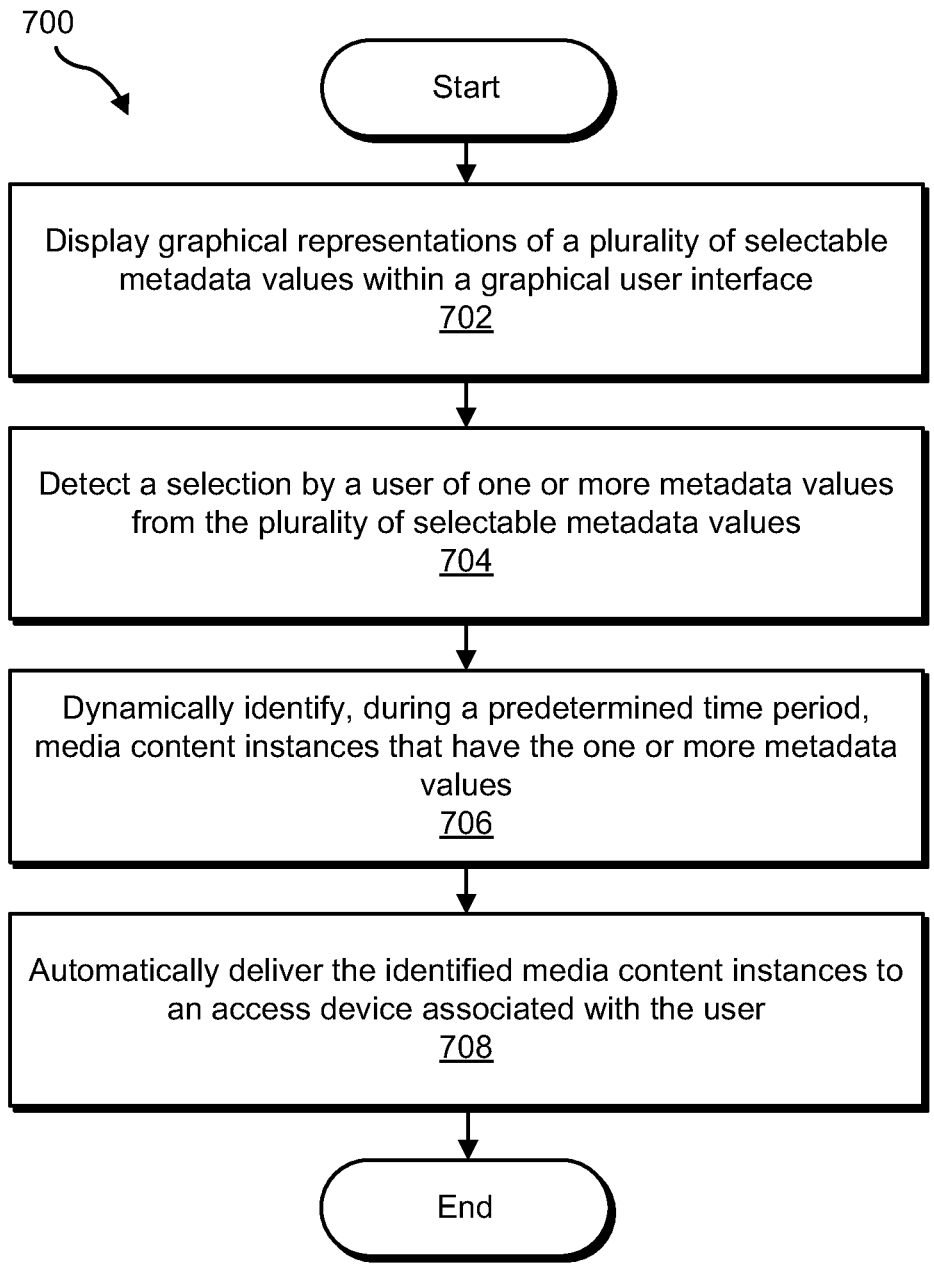
FIG. 7 illustrates another exemplary metadata subscription method according to principles described herein.

FIG. 7 illustrates another exemplary method 700 of providing media content in accordance with a metadata subscription. While FIG. 7 illustrates exemplary steps according to one embodiment, other embodiments may omit, add to, reorder, and/or modify any of the steps shown in FIG. 7. The steps shown in FIG. 7 may be performed by any component or combination of components of system 100.

In step 702, graphical representations of a plurality of selectable metadata values are displayed within a graphical user interface. The graphical representations may be displayed in any of the ways described herein.

In step 704, a selection by a user of one or more metadata values from the plurality of selectable metadata values is detected. The detection may be performed in any of the ways described herein.

In step 706, media content instances that have the one or more metadata values are dynamically identified during a predetermined time period (e.g., a time period of the metadata subscription). The dynamic identification may be performed in any of the ways described herein.

In step 708, the identified media content instances are automatically delivered to an access device associated with the user. The identified media content instances may be automatically delivered to the access device in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
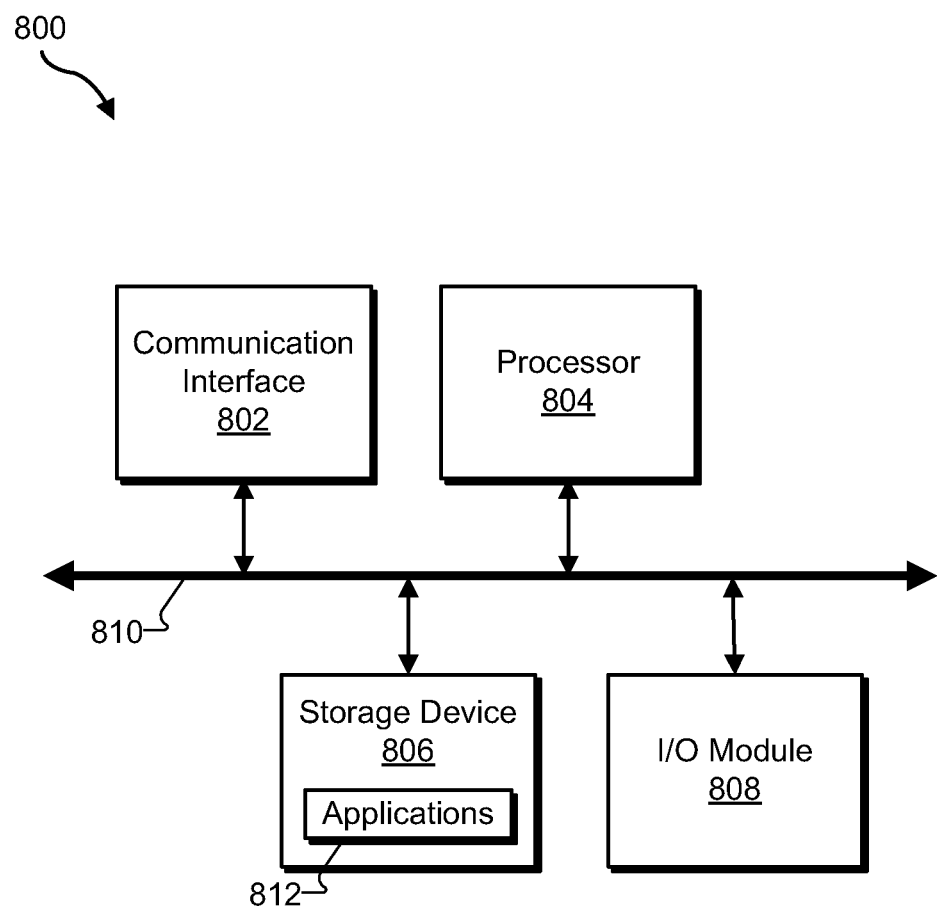
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, and any other suitable interface. In at least one embodiment, communication interface 802 may provide a direct connection between provider subsystem 202 and access subsystem 204 via a direct link to a network, such as the Internet. Communication interface 802 may additionally or alternatively provide such a connection through, for example, a local area network (such as an Ethernet network), a personal area network, a telephone or cable network, a satellite data connection, a dedicated URL, or any other suitable connection. Communication interface 802 may be configured to interface with any suitable communication media, protocols, and formats, including any of those mentioned above.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with metadata subscription facility 102, media content analysis facility 104, and/or access facility 106. Likewise, storage facility 108 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   analyzing, by a metadata subscription system, one or more media content instances accessed by an access device associated with a user;
   automatically generating, by the metadata subscription system, one or more metadata values descriptive of content included in the one or more media content instances accessed by the access device associated with the user based on the analysis of the one or more media content instances;
   receiving, by the metadata subscription system, data representative of a subscription by the user to the one or more metadata values;
   identifying, by the metadata subscription system during a predetermined time period associated with the subscription, at least one media content instance other than the one or more media content instances that has the one or more metadata values descriptive of the content included in the one or more media content instances;
   providing, by the metadata subscription system, the user with access to the identified at least one media content instance via the access device during the predetermined time period associated with the subscription; and
   discontinuing, by the metadata subscription system, the access of the user to the identified at least one media content instance via the access device after the predetermined time period associated with the subscription has elapsed.

2. The method of claim 1, wherein the identifying and providing are dynamically performed during the predetermined time period associated with the subscription.

3. The method of claim 1, further comprising:
   providing, by the metadata subscription system, a graphical user interface with graphical representations of a plurality of selectable metadata values displayed therein; and
   facilitating, by the metadata subscription system, a selection by the user of one or more metadata values from the plurality of selectable metadata values by way of the graphical user interface.

4. The method of claim 1, wherein the one or more media content instances are maintained by the access device associated with the user.

5. The method of claim 1, wherein the providing comprises automatically delivering the identified at least one media content instance to the access device associated with the user.

6. The method of claim 5, wherein the automatically delivering comprises transmitting data representative of the identified at one media content instance to the access device for storage by the access device.

7. The method of claim 1, wherein the discontinuing comprises limiting the access of the user to the at least one media content instance to the predetermined time period associated with the subscription.

8. The method of claim 1, further comprising billing for the access to the at least one media content instance in accordance with a predefined transaction heuristic.

9. The method of claim 8, wherein the billing comprises at least one of billing the user for the access and billing an advertiser for the access.

10. The method of claim 1, wherein the providing comprises directing one or more access devices associated with one or more other users to each transmit at least a portion of the identified at least one media content instance to the access device associated with the user.

11. The method of claim 1, further comprising receiving data representative of one or more instructions to exclude one or more other metadata values from the subscription.

12. The method of claim 1, wherein the analyzing of the one or more media content instances accessed by the access device comprises determining that the one or more metadata values descriptive of the content included in the one or more media content instances appear more often than one or more other metadata values descriptive of the content included in the one or more media content instances accessed by the access device.

13. The method of claim 12, wherein the determining that the one or more metadata values descriptive of the content included in the one or more media content instances appear more often than the one or more other metadata values comprises determining that a majority of the one or more media content instances accessed by the access device have the one or more metadata values.

14. A method comprising:
analyzing, by a metadata subscription system, one or more media content instances accessed by an access device associated with a user;
automatically generating, by the metadata subscription system, one or more metadata values descriptive of content included in the one or more media content instances accessed by the access device associated with the user based on the analysis of the one or more media content instances;
displaying, by the metadata subscription system, graphical representations of a plurality of selectable metadata values within a graphical user interface;
detecting, by the metadata subscription system, a selection by a user of one or more metadata values from the plurality of selectable metadata values;
dynamically identifying, by the metadata subscription system during a predetermined time period, at least one media content instance other than the one or more media content instances that has the one or more automatically generated metadata values descriptive of the content included in the one or more media content instances or the one or more user selected metadata values;
automatically delivering, by the metadata subscription system during the predetermined time period, the identified media content instance to the access device associated with the user; and
discontinuing, by the metadata subscription system after the predetermined time period has elapsed, access by the access device to the identified media content instance.

15. The method of claim 14, wherein the predetermined time period is associated with a subscription by the user to the one or more automatically generated metadata values and the one or more user selected metadata values.

16. The method of claim 14, wherein the automatic delivering comprises directing one or more access devices associated with one or more other users to transmit the identified media content instance to the access device associated with the user.

17. A system comprising:
at least one physical computing device comprising
a media content analysis facility configured to
analyze one or more media content instances accessed by an access device associated with a user;
automatically generate one or more metadata values descriptive of content included in the one or more media content instances accessed by the access device associated with the user based on the analysis of the one or more media content instances;
a metadata subscription facility communicatively coupled to the media content analysis facility and configured to receive data representative of a subscription by the user to the one or more metadata values;
wherein the media content analysis facility is further configured to identify at least one media content instance other than the one or more media content instances that has the one or more metadata values descriptive of the content included in the one or more media content instances during a predetermined time period associated with the subscription; and
an access facility communicatively coupled to the media content analysis facility and configured to
provide the user with access to the identified at least one media content instance during the predetermined time period associated with the subscription, and
discontinue the access of the user to the identified at least one media content instance after the predetermined time period associated with the subscription has elapsed.

18. The system of claim 17, wherein the media content analysis facility is further configured to dynamically identify a plurality of media content instances that have the one or more metadata values during the predetermined time period associated with the subscription; and
wherein the access facility is further configured to dynamically provide the user with access to the identified plurality of media content instances during the predetermined time period.

19. The system of claim 17, wherein the metadata subscription facility is further configured to
provide a graphical user interface with graphical representations of a plurality of selectable metadata values displayed therein, and
facilitate a selection by the user of one or more metadata values from the plurality of selectable metadata values by way of the graphical user interface.

20. The system of claim 17, wherein the media content analysis facility is further configured to determine that the one or more metadata values descriptive of the content included in the one or more media content instances appear more often than one or more other metadata values descriptive of the content included in the one or more media content instances accessed by the access device.

21. A non-transitory computer-readable medium tangibly embodying computer-executable instructions that, upon execution, direct at least one computing device to:
analyze one or more media content instances accessed by an access device associated with a user;
automatically generate one or more metadata values descriptive of content included in the one or more media content instances accessed by the access device associated with the user based on the analysis of the one or more media content instances;
receive data representative of a subscription by the user to the one or more metadata values;
identify, during a predetermined time period, at least one media content instance other than the one or more media content instances that has the one or more metadata values descriptive of the content included in the one or more media content instances;
provide the user with access to the identified at least one media content instance via the access device during the predetermined time period associated with the subscription; and discontinue the access of the user to the identified at least one media content instance via the access device after the predetermined time period associated with the subscription has elapsed.

22. A non-transitory computer-readable medium tangibly embodying computer-executable instructions that, upon execution, direct at least one computing device to:

analyze one or more media content instances accessed by an access device associated with a user;

automatically generate one or more metadata values descriptive of content included in the one or more media content instances accessed by the access device associated with the user based on the analysis of the one or more media content instances;

display graphical representations of a plurality of selectable metadata values within a graphical user interface;

detect a selection by a user of one or more metadata values from the plurality of selectable metadata values;

dynamically identify, during a predetermined time period, at least one media content instance other than the one or more media content instances that has the one or more automatically generated metadata values descriptive of the content included in the one or more media content instances or the one or more user selected metadata values;

automatically deliver, during the predetermined time period, the identified media content instance to the access device associated with the user; and discontinue, after the predetermined time period has elapsed, access by the access device to the identified media content instance.

* * * * *